(12) United States Patent
Ogawa et al.

(10) Patent No.: US 7,521,828 B2
(45) Date of Patent: Apr. 21, 2009

(54) SEGMENT CONNECTION TYPE ELECTRIC ROTATING MACHINE

(75) Inventors: Shinichi Ogawa, Oobu (JP); Toshikazu Kato, Kuwana (JP)

(73) Assignee: Denso Corporation, Kariya (JP)

( * ) Notice: Subject to any disclaimer, the term of this patent is extended or adjusted under 35 U.S.C. 154(b) by 388 days.

(21) Appl. No.: 11/334,460

(22) Filed: Jan. 19, 2006

(65) Prior Publication Data
US 2006/0163959 A1 Jul. 27, 2006

(30) Foreign Application Priority Data
Jan. 27, 2005 (JP) ............................. 2005-019957

(51) Int. Cl.
*H02K 3/04* (2006.01)
(52) U.S. Cl. ...................... 310/71; 310/179; 310/201
(58) Field of Classification Search .................. 310/71, 310/179, 89
See application file for complete search history.

(56) References Cited
U.S. PATENT DOCUMENTS

| | | | | |
|---|---|---|---|---|
| 4,451,750 | A * | 5/1984 | Heuer et al. | 310/88 |
| 5,007,156 | A * | 4/1991 | Hurtgen | 29/596 |
| 5,532,533 | A * | 7/1996 | Mizutani | 310/68 B |
| 6,211,594 | B1 * | 4/2001 | Umeda et al. | 310/180 |
| 6,249,956 | B1 | 6/2001 | Maeda et al. | |
| 6,429,556 | B1 * | 8/2002 | Nakamura et al. | 310/71 |
| 6,530,140 | B2 | 3/2003 | Maeda et al. | |
| 6,624,544 | B2 * | 9/2003 | Higashino et al. | 310/201 |
| 6,700,236 | B2 * | 3/2004 | Umeda et al. | 310/54 |
| 6,791,228 | B2 | 9/2004 | Hashiba et al. | |
| 2002/0053126 | A1 | 5/2002 | Maeda et al. | |
| 2004/0061400 | A1 * | 4/2004 | Fukushima et al. | 310/184 |
| 2005/0275296 | A1 * | 12/2005 | Kumakura et al. | 310/71 |

FOREIGN PATENT DOCUMENTS

| | | |
|---|---|---|
| JP | 2000-166149 | 6/2000 |
| JP | 3118837 B2 | 10/2000 |
| JP | 3196738 B2 | 6/2001 |
| JP | 2003-348780 | 12/2003 |

* cited by examiner

*Primary Examiner*—Burton Mullins
(74) *Attorney, Agent, or Firm*—Oliff & Berridge, PLC (57) ABSTRACT

The segment connection type electric rotating machine includes a stator coil constituted by phase coils each of which includes a U-shaped segment continuum formed by U-shaped conductor segments inserted into slots of a stator core, an I-shaped leading conductor segment inserted into one of the slots and connected to a lead end of the U-shaped segment continuum, and an I-shaped terminating conductor segment inserted into one of the slots and connected to a terminal end of the U-shaped segment continuum. A connector box fixed to the outer periphery of the stator core. A power supply lead is laid between the connector box and the I-shaped leading conductor segment. The power supply lead is welded at a tip portion thereof to an end portion of the I-shaped leading conductor segment in the vicinity of head-side coil ends of the stator coil.

10 Claims, 5 Drawing Sheets

SEGMENT CONNECTION TYPE ELECTRIC ROTATING MACHINE

CROSS-REFERENCE TO RELATED APPLICATION

This application is related to Japanese Patent Application No. 2005-19957 filed on Jan. 27, 2005, the contents of which are hereby incorporated by reference.

BACKGROUND OF THE INVENTION

1. Field of the Invention

The present invention relates to an electric rotating machine of the segment connection type including U-shaped conductor segments fitted into slots of its stator core and connected to one another at a side of one of end surfaces of the stator core with respect to an axial direction to thereby form a stator coil.

2. Description of Related Art

An electric rotating machine having a segment connection type stator coil formed by a plurality of conductor segments (may be simply referred to as "segments" hereinafter) made of insulated rectangular wire, which are fitted into slots of its stator core and sequentially connected to one another, can be made smaller in size and weight than a conventional electric rotating machine having a wire-wound type stator coil, because the segment connection type stator coil allows the stator to have a high conductor space factor, and allows the coil ends to have a short axial length.

Such an electric rotating machine having the segment connection type stator coil (may be referred to as "segment connection type electric rotating machine" hereinafter) is described in Japanese Patents No. 3118837 and No. 3196738, and Japanese Patent Applications Laid-open No. 2003-348780, and Laid-open No. 2000-166149, for example. In forming the segment connection type stator coil, two leg parts a U-shaped segment are separately inserted into two slots apart from each other by a distance equal to a pole pitch of a rotor, and then portions of the leg parts protruding from the slots are bent in the circumferential direction in order to join the tip ends of the leg parts to each other.

The U-shaped segment has a head part and two leg parts. Each one of the leg parts has an in-slot conductor portion situated within a slot, and a protruding portion protruding from the slot and bent in the circumferential direction. The head parts of the U-shaped segments make coil ends of the stator coil at a side of one of the end surfaces of the stator core with respect to the axial direction, while the protruding portions of the leg parts of the U-shaped segments make coil ends of the stator coil at a side of the other of the end surfaces.

The segment connection type stator coil is formed by star-connecting or delta-connecting phase coils as many as the number of the phases. Each of the phase coils is constituted by a plurality of the U-shaped segments sequentially connected to one another at their protruding portions (may be referred to as "U-shaped segment continuum" hereinafter), an I-shaped leading segment connected to the leading end of the U-shaped segment continuum, and an I-shaped terminating segment connected to the terminal end of the U-shaped segment continuum.

The portion of each of the leading segment and terminating segment protruding from the slot is bent so as to extend in the circumferential direction for a length equal to half the pole pitch as in the case of the protruding portion of the U-shaped segment. The two slots into which the leading segment and terminating segment are inserted, respectively, are distant from each other by the pole pitch.

This configuration makes it possible to avoid a neutral point and a power supply lead from becoming obstacles in connecting the U-shaped segments at their leg-side coil ends, because the neutral point and the power supply lead can be situated at the side of their head-side coil ends. The leading segment is extended to a connector as a power supply lead where it is connected to an external cable supplying electric power.

Each of the slots has an even number of conductor holding spaces therein which are aligned in the radial direction. Two leg parts of one U-shaped segment are held separately in two conductor holding spaces having different radial positions. The leading segment and terminating segment are also held in two conductor holding spaces having different radial positions.

The U-shaped segment continuum can be constituted by a plurality of the U-shaped segments occupying radially adjacent two conductor holding spaces. In this case, one of the two leg parts of one U-shaped segment protruding from a first conductor holding space of one slot is bent so as to extend by half the pole pitch in the circumferential direction, and one of the two leg parts of another U-shaped segment protruding from a second conductor holding space of another slot distant from the above one slot by the pole pitch is bent so as to extend by half the pole pitch in the opposite circumferential direction. These two leg parts are connected to each other at their tips (protruding ends) opposing with each other. The U-shaped segment continuum having such a configuration may be referred to as "two-layer type U-shaped segment continuum" hereinafter. The leading segment and the terminating segment of the two-layer type U-shaped segment continuum are individually held in two conductor holding spaces having different axial positions.

In another example, the U-shaped segment continuum can be constituted by a plurality of the U-shaped segments occupying radially adjacent four conductor holding spaces. The U-shaped segment continuum having such a configuration may be referred to as "four-layer type U-shaped segment continuum" hereinafter.

One example of the four-layer type U-shaped segment continuum includes a large-sized U-shaped conductor segment (may be referred to as "large segment" hereinafter) and a small-sized U-shaped conductor segment (may be referred to as "small segment" hereinafter). The large segment is inserted into the first one (the innermost one) and the fourth one (the outermost one) of the radially adjacent four conductor holding spaces, and the small segment is inserted into the second one and the third one of the radially adjacent four conductor holding spaces.

The tip portion (protruding portion) of the leg part of the large segment protruding from the innermost conductor holding space is bent so as to extend by half the pole pitch in the circumferential direction. The tip portion (protruding portion) of the leg part of the small segment protruding from the second conductor holding space is bent so as to extend by half the pole pitch in the circumferential direction. These tip portions of the large and small segments are connected to each other.

The tip portion (protruding portion) of the leg part of the large segment protruding from the outermost conductor holding space is bent so as to extend by half the pole pitch in the circumferential direction. The tip portion (protruding portion) of the leg part of the small segment protruding from the third conductor holding space is bent so as to extend by half the pole pitch in the circumferential direction. The tip portion of the large segment protruding from the outermost conductor holding space and the tip portion of the small segment protruding form the third conductor holding space are connected to each other.

In the four-layer type U-shaped segment continuum, since the head part of the large segment is situated so as to cover the head part of the small segment, the leading segment and the terminating segment are inserted into the innermost conductor holding space and the outermost conductor holding space individually.

In a case where each slot has six conductor holding spaces, the two-layer type U-shaped segment continuum and the four-layer type U-shaped segment continuum can be connected in series. In this case, the leading segment or the terminating segment of the two-layer type U-shaped segment continuum is connected to the leading segment or the terminating segment of the four-layer type U-shaped segment continuum. Alternatively, if they are replaced by a special U-shaped segment, the two-layer type U-shaped segment continuum and the four-layer type U-shaped segment continuum can be directly connected to each other.

In a case where the slot has eight conductor holding spaces aligned in the axial direction, two four-layer type U-shaped segment continua can be connected in series. In this case, the leading segment or the terminating segment of one of the two four-layer type U-shaped segment continua is connected to the leading segment or the terminating segment of the other of the two four-layer type U-shaped segment continua. Alternatively, if they are replaced by a special U-shaped segment, the two four-layer type U-shaped segment continua can be directly connected to each other.

To generalize, if the slot has 4n+2 conductor holding spaces (n being a positive integer), the series-connected structure of the two-layer type U-shaped segment continuum and/or the four-layer type U-shaped segment continuum can be used.

If the slot has eight conductor holding spaces, four two-layer type U-shaped segment continua connected in series, or two four-layer type U-shaped segment continua connected in series can be used. Although they can be connected in parallel, it is preferable to use the series connection in view of reducing the armature current. Since such a series-connected structure of the two-layer type U-shaped segment continuum and/or the four-layer type U-shaped segment continuum are described in detail in the above mentioned patent documents, no further explanation is given here.

Next, an example of manufacturing the above described segment connection type stator coil is explained.

At the beginning, a necessary number of two-forked conductor segments are aligned circumferentially, and thereafter, they are worked to become the U-shaped segments each of which has two in-slot conductor portions distant from each other by the pole pitch, so that they can be inserted into corresponding slots of the stator core at once. The above process can be done by use of two coaxial perforated rings, for example. In this case, the two legs of each of the two-forked conductor segment are separately inserted into two holes of the two rings situated in the same circumferential position, and then the rings are relatively turned around by the pole pitch.

After that, the legs are pulled out from the holes with the head portions of the conductor segments deformed into a U shape being fixed, and are inserted into corresponding slots of the stator core.

Next, the portions of the U-shaped segments protruding from the slots are bent in the circumferential direction. Preferably, the protruding portions are bent such that they extend in the circumferential direction by half the pole pitch. The above bend work can be done by use of two coaxial perforated rings, for example. In this case, the protruding portions of the U-shaped segments are separately inserted into corresponding holes of the rings, and then the rings are turned around by half the pole pitch (or the electric angle of $\pi/2$). Finally, welding work of the protruding portions are carried out.

In the electric rotating machine having the segment connection type stator coil, the I-shaped leading segment of each of the phase coils is extended as a power supply lead to a connector box fixed to a motor housing. When the electric rotating machine is of the star-connection type, the I-shaped terminating segment of each of the phase coils is extended in the circumferential direction as a neutral point connecting lead.

The electric rotating machine having the segment connection type stator coil disclosed in Japanese Patent Application Laid-open No. 2003-348780 has a problem in that the outer dimension thereof becomes large, because, in this electric rotating machine, the neutral point connecting lead is taken from the outermost conductor holding space, and the power supply lead is laid between the outermost conductor holding space and a connector disposed on a radially inner side of the stator along the head-side coil ends.

Also, the electric rotating machine having the segment connection type stator coil disclosed in Japanese Patent Application Laid-open No. 2000-166149 has the same problem, because, in this electric rotating machine, the neutral point connecting lead is taken from the outermost or innermost conductor holding space, and the power supply lead is taken from a conductor holding space other than the innermost and outer most conductor holding spaces (may be referred to as "intermediate conductor holding space" hereinafter), which make the axial length of the coil ends large.

In addition, the electric rotating machines disclosed in Japanese Patent Applications Laid-open No. 2003-348780 and Laid-open No. 2000-166149 have a problem in that the neutral point connecting lead may deform to thereby come into contact with the rotor when the neutral point connecting lead is taken from the innermost conductor holding space. On the other hand, when the neutral point connecting lead is taken from the outermost conductor holding space, there arises another problem in that the neutral point connecting lead may interact with the inner surface of the motor housing, which makes motor assembling work difficult.

Furthermore, the bending work of the power supply lead made of rectangular wire has been difficult to perform, since the rectangular wire is hard to bend compared to the round wire having the same cross-sectional area. This lowers the efficiency of the motor assembling work, especially when the connector for connecting the power supply lead to an outgoing cable is provided in the external surface of the motor housing.

SUMMARY OF THE INVENTION

The present invention provides a segment connection type electric rotating machine including:

a stator coil constituted by phase coils each of which includes a U-shaped segment continuum formed by U-shaped conductor segments inserted into slots of a stator core from one of end surfaces of the stator core with respect to an axial direction of the stator core and connected to one another at the other one of the end surfaces, an I-shaped leading conductor segment inserted into one of the slots and connected to a lead end of the U-shaped segment continuum at the other one of the end surfaces, and an I-shaped terminating conductor segment inserted into one of the slots and connected to a terminal end of the of the U-shaped segment continuum at the other one of the end surfaces;

a connector box fixed to an outer periphery of the stator core; and a power supply lead laid between the connector box and the I-shaped leading conductor segment, the power supply lead being welded at a tip portion thereof to an end portion of the I-shaped leading conductor segment in the vicinity of head-side coil ends of the stator coil.

The present invention makes it possible to use a wire having any shape of cross section (round wire, for example) which is easy to bend compared to a rectangular wire as the power supply lead. Accordingly, with the present invention, the connector box (cluster block) can be installed on the outer periphery of the stator core, as a result of which the outer dimension of the electric rotating machine can be reduced.

PREFERRED EMBODIMENTS OF THE INVENTION

Figure 1:
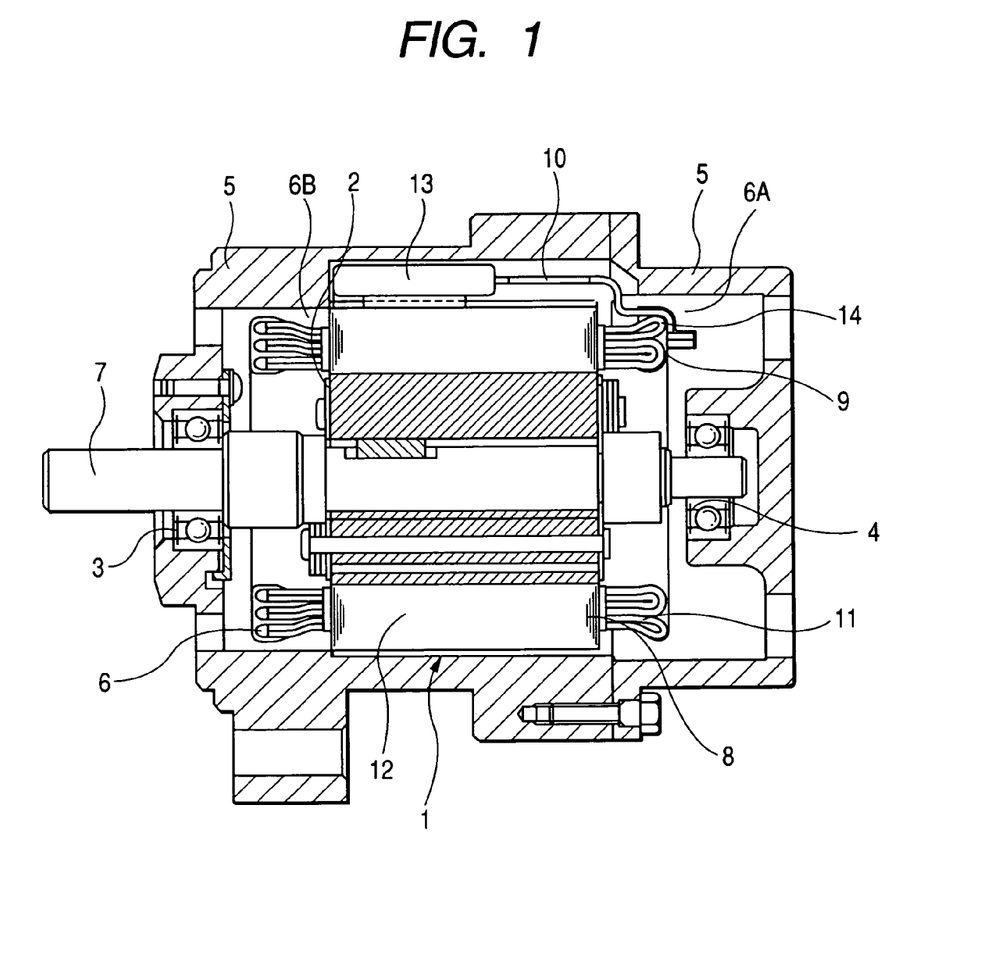
FIG. 1 is an axial cross-sectional view of a segment connection type electric rotating machine according to an embodiment of the invention.

FIG. 1 is an axial cross-sectional view of a segment connection type electric rotating machine usable as a motor for driving a vehicle wheel according to a first embodiment of the invention.

In FIG. 1, the reference numeral 1 denotes a stator, 2 denotes a rotor, 3 denotes a front bearing, 4 denotes a rear bearing, 5 denotes a frame (motor housing), 6 denotes a stator coil, 7 denotes a rotary shaft, 8 denotes an insulator, 9 denotes a coil lead, 10 denotes a power supply lead, 11 denotes a U-shaped conductor segment, 12 denotes a stator core, 13 denotes a cluster block (connector box), and 14 denotes a powder-processed insulating resin. The reference characters 6A and 6B denote head-side coil ends, and leg-side coil ends of the stator coil 6, respectively.

In this electric rotating machine, which is an inner-rotor type motor, the stator 1 is fixed to the inner surface of the frame 5, the rotor 2 is fitted to the rotary shaft 7, and the both ends of the rotary shaft 7 are rotatably supported by the frame 5 through the front bearing 3 and the rear bearing 4. The stator 1 is constituted by the stator core 12 and the stator coil 6 including three star-connected phase coils.

The coil lead 9 integral with an I-shaped leading conductor segment of each of the phase coils is extended beyond the head-side coil ends in the axial direction, and bent in the circumferential direction to be welded to the end portion of the power supply lead 10. The power supply lead 10 is routed to the cluster box 13 fixed to the outer periphery of the stator core 12, where it is applied with a power supply voltage. Each of the phase coils has an I-shaped terminating conductor segment as a neutral point connecting lead extended in the axial direction beyond the head-side coil ends and bent in the circumferential direction to be welded to other neutral point connecting leads to thereby form a neutral point 16.

The head-side coil ends 6A, the coil lead (that is, the portion of the I-shaped leading segment protruding beyond the head-side coil ends 6A) 9, the neutral point (that is, the portion of the I-shaped terminating segment protruding beyond the head-side coil ends 6A) 16 are covered by the insulating resin 14. The leg-side coil ends are also covered by the insulating resin. The insulator 8 is for insulation between the in-slot conductor portions of the U-shaped segments and the exposed surfaces of the slots of the stator core 12.

The rotor 2 has permanent magnets embedded in its inner surface such that magnetic polarity alternates at a predetermined pole pitch along the circumferential direction. Accordingly, the electric rotating machine of this embodiment operates as a permanent magnet type three phase synchronous motor. The rotor 2 may have the Lundel-type pole core structure.

Figure 2:
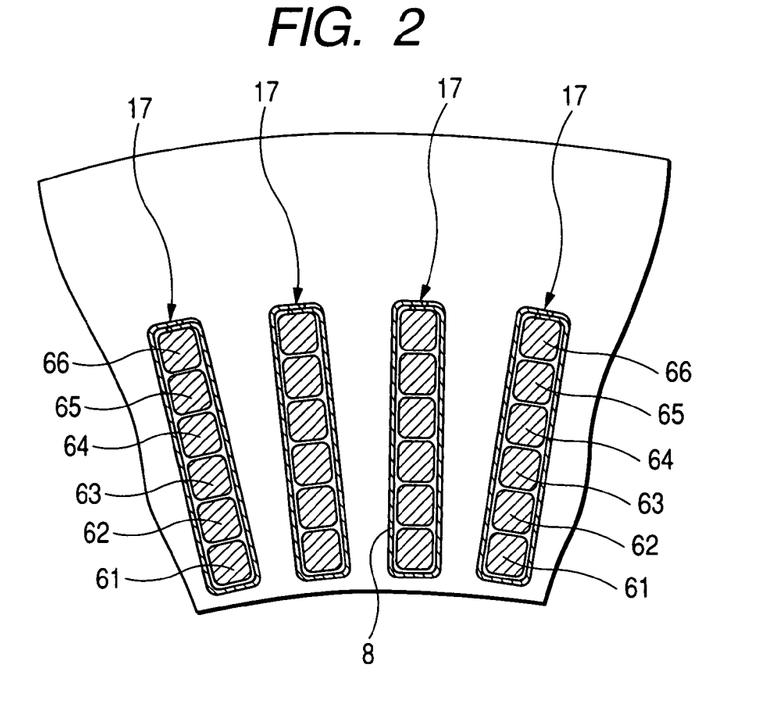
FIG. 2 is a partial cross sectional view of a stator core of the electric rotating machine according to the embodiment of the invention.
Figure 3:
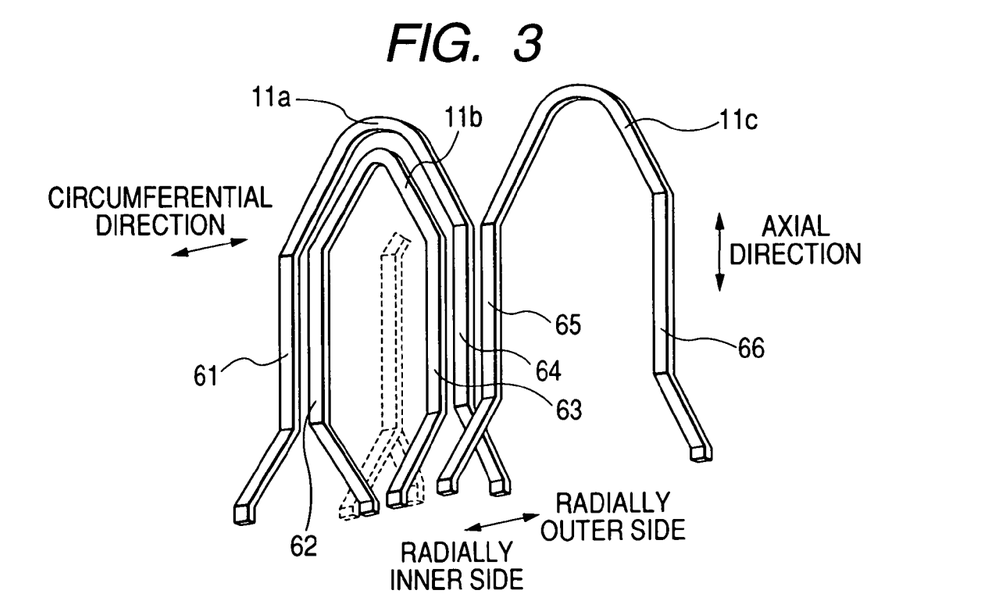
FIG. 3 is a diagram explaining positional relationships among in-slot conductor portions of U-shaped segments inserted into the same slot of the stator core of the electric rotating machine according to the embodiment of the invention.

As shown in FIG. 2, in each one of the slots 17 of the stator core 12, in-slot conductor portions 61 to 66 of six U-shaped segments are held in six conductor holding spaces aligned in the axial direction. FIG. 3 is a diagram explaining positional relationship among the in-slot conductor portions 61 to 66. The in-slot conductor portion 61 is held in the innermost conductor holding space, the in-slot conductor portion 62 is held in the second innermost conductor holding space, the in-slot conductor portion 63 is held in the third innermost conductor holding space, the in-slot conductor portion 64 is held in the fourth innermost conductor holding space, the in-slot conductor portion 65 is held in the fifth innermost conductor holding space, and the in-slot conductor portion 66 is held in the sixth innermost conductor holding space (the outermost conductor holding space). As shown in FIG. 3, the in-slot conductor portions 61 and 64 are portions of a large segment 11a, and the in-slot conductor portions 62 and 63 are portions of a small segment 11b. The large segment 11a and the small segment constitute a four-layer type U-shaped segment continuum. The in-slot conductor portions 65 and 66 are portions of a conductor segment 11c constituting a two-layer type U-shaped segment continuum.

The stator 1 has, for each of the three phases, one four-layer type U-shaped segment continuum as a partial phase coil fitted to four radially inner conductor holding spaces, and one two-layer type U-shaped segment continuum as another partial phase coil fitted to two radially outer conductor holding spaces. The partial phase coil of the two-layer type U-shaped segment continuum and the partial phase coil of the four-layer type U-shaped segment continuum are connected to each other through a deformed U-shaped segment to thereby form one of the phase coils. The three I-shaped terminating segments of the three phase coils, each of which constitutes the neutral point connecting lead, are welded to one another to thereby form the neutral point 16. The I-shaped three leading segments of the three phase coils, each of which constitutes the coil lead 9, are welded to the tip portion of the power supply lead 10 routed to the cluster block 13.

As understood from the above explanation, the electric rotating machine of this embodiment is a six-layer-segment connection type electric rotating machine. Since such a six-layer-segment-connection type electric rotating machine is publicly known (refer to Japanese Patent Applications No. 2002-171236, and No. 2002-221256 filed by the same applicant as the present application, for example), no further explanation thereof is given here.

The Power Supply Lead 10

Figure 4:
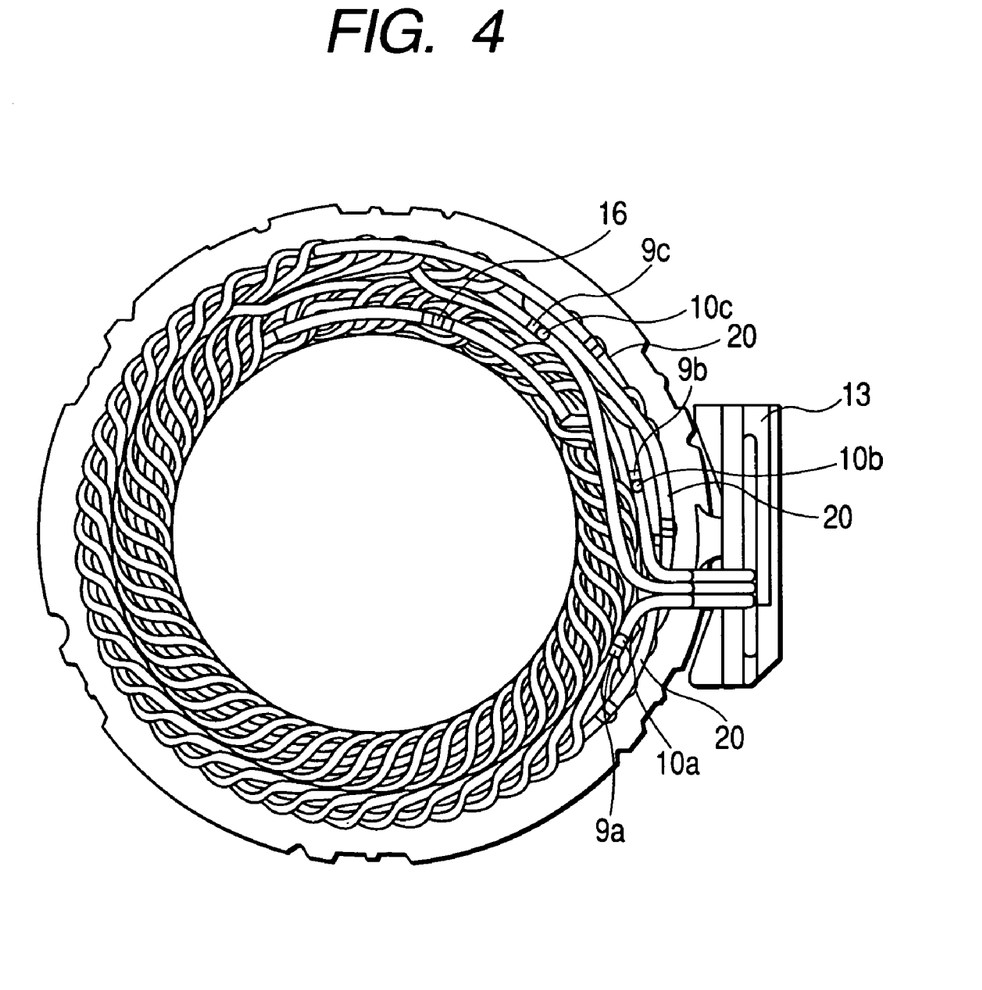
FIG. 4 is a front view of a stator coil of the electric rotating machine according to the embodiment of the invention when viewed from its rear side.

Next, the structure of the power supply lead 10 is explained with reference to FIG. 4 which is a front view of the stator coil when viewed from the side of the rear bearing 4.

As explained above with reference to FIGS. 2 and 3, in each of the slots 17, the two-layer type U-shaped segment continuum is held by the two radially outer conductor holding spaces (the fifth and sixth conductor holding spaces), and the four-layer type U-shaped segment continuum is held by the four radially inner conductor holding spaces (the first to fourth conductor holding spaces).

In this embodiment, the terminal end of the partial coil of the two-layer type U-shaped segment continuum is connected to the lead end of the four-layer type U-shaped segment continuum through the deformed U-shaped segment held by the fourth and the sixth conductor holding spaces, in order that the second and fifth conductor holding spaces become empty spaces. Thus, in this embodiment, the I-shaped leading segment is held by the fifth conductor holding space, and the I-shaped terminating segment is held by the second conductor holding space.

Since the stator coil 6 has the three phase coils, the three of the I-shaped leading segments situated in the different circumferential positions extend from the fifth conductor holding spaces in the axial direction beyond the head-side coil ends 6A. These three leading segments are further extended in the circumferential direction. The end portions of the leading segments protruding in the axial direction beyond the head-side coil ends 6A are designated as the coil leads. In FIG. 4, the reference character 9a denotes the coil lead for the U phase, 9b denotes the coil lead for the V phase, and 9c denotes the coil lead for the W phase. These three coil leads are collectively called as the coil lead 9.

Likewise, since the stator coil 6 has the three phase coils, the three of the I-shaped terminating segments situated in the different circumferential positions extend from the second conductor holding spaces in the axial direction beyond the head-side coil ends 6A. Two of these three terminating segments are further extended in the direction that their end portions approach to each other in the circumferential direction. The end portions of the terminating segments protruding in the axial direction beyond the head-side coil ends 6A are designated as neutral point connecting leads. Two of the three neutral point connecting leads, which are situated in different circumferential positions between which the other one (the middle one) of the three neutral point connecting leads is situated, are extended in the circumferential direction to reach the middle neutral point connecting lead, so that they can be welded altogether to form the neutral point 16.

Each of the ends of the coil leads 9a, 9b, 9c is welded to corresponding one of the ends of the power supply phase leads 10a, 10b, 10c. The power supply phase leads 10a, 10b, 10c are collectively called the power supply lead 10. The power supply phase leads 10a, 10b, 10c are extended over the head-side coil ends 6A in the circumferential direction to reach the same circumferential position as the cluster block 13, and bent outward in the axial direction at this position.

Figure 5:
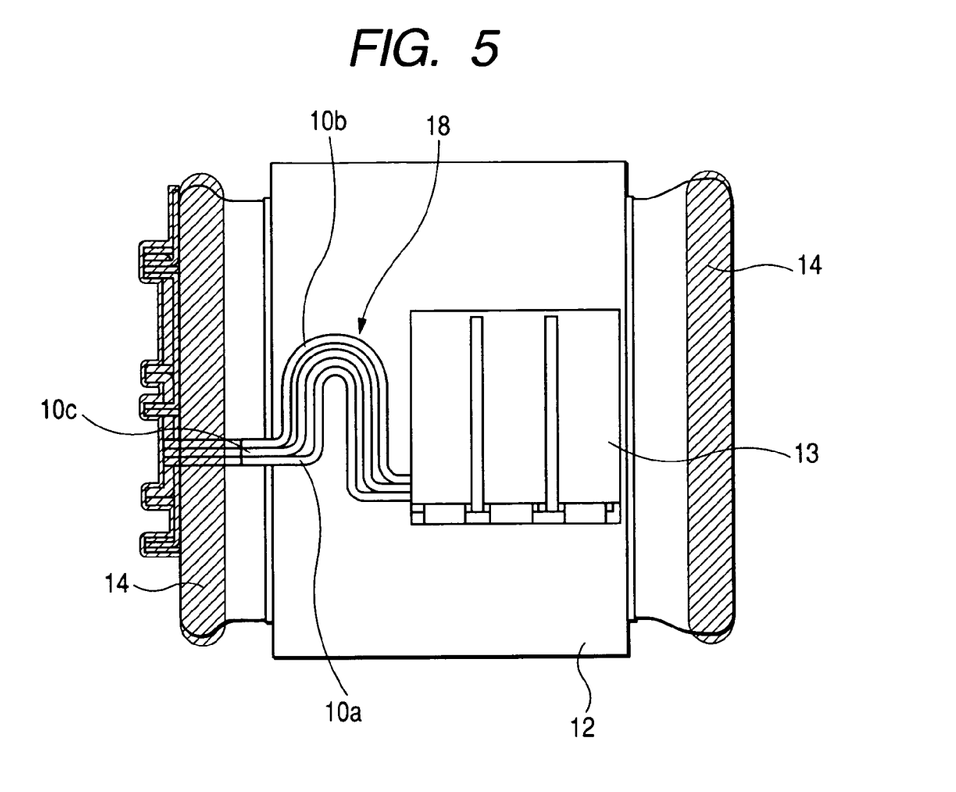
FIG. 5 is a plan view of the stator core of the electric rotating machine according to the embodiment of the invention.

FIG. 5 is a plan view of the stator core 12 for explaining how the power supply lead 10 is routed over the outer periphery of the stator core 12. As shown in this figure, the power supply phase leads 10a, 10b, 10c running side by side until the cluster block 13 have a U-bend part 18. The U-bend part 18 is formed by bending the power supply phase leads 10a, 10b, 10c in the circumferential direction, bending them in the axial direction, and again bending them in the opposite circumferential direction. The power supply phase leads 10a, 10b, 10c bent to form the U-bend part 18 are further bent to run in the axial direction to enter the cluster block 13. The cluster block 13 includes therein an inverter circuit generating three-phase AC voltage.

In this embodiment, all the conductor segments are made of rectangular wire so that the stator core 12 can have a high conductor space factor, whereas all the power supply phase leads 10a, 10b, 10c are made of round wire which is circular in cross section. The reason is that using a round wire as the power supply lead 10 greatly facilitates the bending work of the power supply lead 10, since the round wire can be bent more easily than the rectangular wire. In addition, using a round wire as the power supply lead 10 provides an advantage of reducing the chance of the power supply lead 10 damaging the resin coat of the conductor segments at the head-side coil ends. Furthermore, using a round wire as the power supply lead 10 improves drapability of the insulating resin coat when performing resin powder coating work on the power supply lead 10, because the power supply lead 10 does not have any angular portions.

Welding Between the Coil Lead and the Power Supply Lead

Next, how the coil lead and the power supply lead are welded to each other is explained below referring to FIG. 6 and FIG. 7. Here, since the end portions of the coil leads 9a, 9b, 9c have the same shape, and the tip portions of the power supply phase leads 10a, 10b, 10c have the same shape, explanation is made only to the welding between the coil lead 9b and the power supply phase lead 10b of the V phase.

Figure 6:
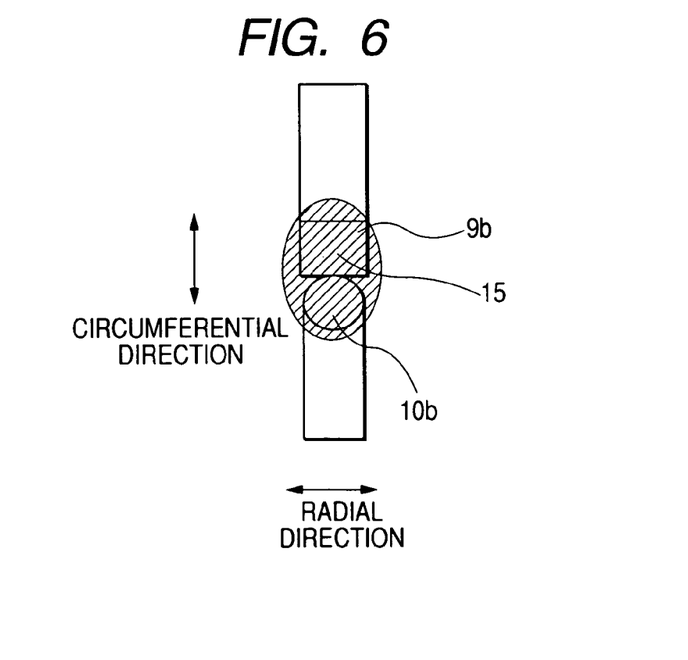
FIGS. 6 and 7 are diagrams showing a welded portion between a coil lead and a power supply lead in the electric rotating machine according to the embodiment of the invention.
Figure 7:
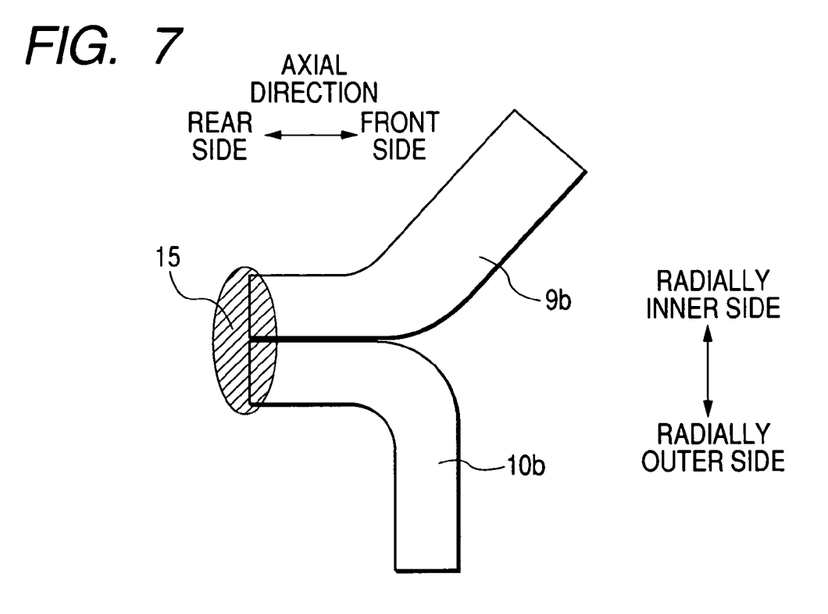

As shown in FIGS. 6 and 7, each of the end portion of the coil lead 9b and the tip portion of the power supply phase lead 10b includes a bent portion extending in the axial direction. These bent portions are in abutting contact with each other. Accordingly, it is possible to avoid the resin coats of the coil lead 9b and the power supply phase lead 10b from suffering from thermal damage at portions other than their bent portions and to avoid the head-side coil ends from suffering thermal damage, when the end portion of the coil lead 9 and the tip portion of the power supply phase lead 10b are welded to each other by the TIG welding method, for example. This facilitates the welding work.

Generally, it is difficult to perform welding between a round wire and a rectangular wire. However, in this embodiment, since the coil lead 9b and the power supply phase lead 10b are worked to have bent portions which are in abutting contact with each other and extend in the axial direction, they can be welded with high degree of reliability because of their sufficiently large contact areas.

The same is true of the welding of the end portions of the neutral point connecting leads. The reference numeral 20 in FIG. 4 denotes interconnecting leads series-connecting segments constituting the partial phase coil of the two-layer type U-shaped segment continuum. The interconnecting leads can be welded to each other in a similar way as above.

Adhesion of the Insulating Resin 14

Figure 8:
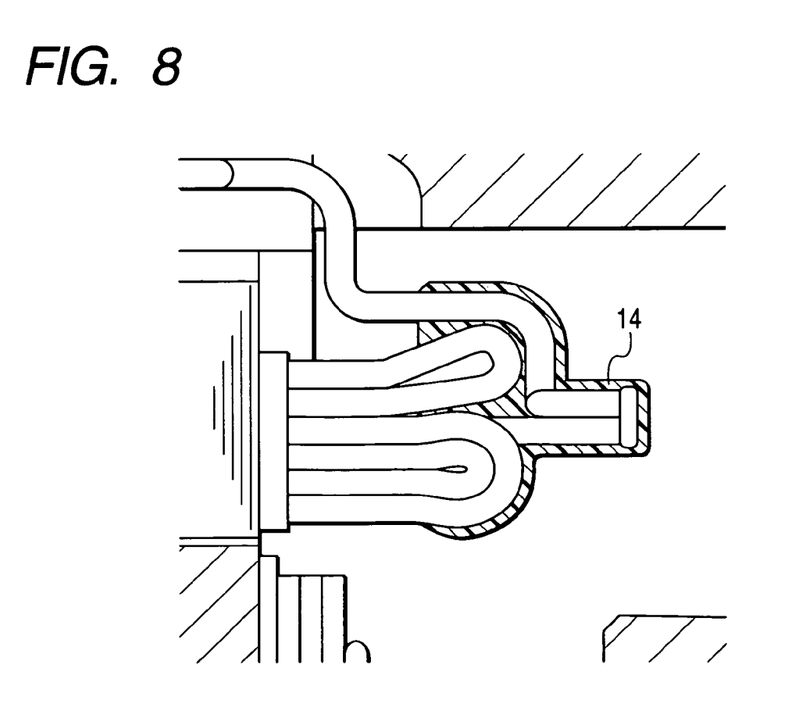
FIG. 8 is a diagram showing an insulating resin covering the head-side coil ends and the welded portion between the coil lead and the power supply lead in the electric rotating machine according to the embodiment of the invention.

As explained above, in this embodiment, the head-side coil ends 6A, coil lead 9, power supply lead 10 and neutral point 16 are covered by the powder-processed insulating resin 14. FIG. 8 shows the insulating resin 14 covering the head-side coil ends 6A.

In this embodiment, epoxy resin powder is applied to the surfaces of the head-side coil ends 6A, coil lead 9 and power supply lead 10, and then heat is applied to the epoxy resin powder so that it melts and adheres to them. Likewise, welded portions of the leg-side coil ends 6B are covered by the epoxy resin. Accordingly, the problem that welded portions may break due to vibration of the power supply lead 10 which may occur in the conventional electric rotating machines can be eliminated.

It should be noted that, although a portion of the power supply lead 10 laid on the outer periphery of the stator core 12 does not undergo rigidity reinforcement by the insulating resin coating, the vibration applied to this portion can be absorbed by the U-bend part 18.

In this embodiment, since a round wire which is easy to bend is used as the power supply lead 10, the connector box (cluster block) can be installed on the outer periphery of the stator core. This makes it possible to reduce the outer dimension of the electric rotating machine.

Furthermore, since the coil lead is made by bending the I-shaped leading segment in the circumferential direction, it is possible to avoid the coil lead from protruding outward in the radial direction beyond the outer periphery of the stator core 12. Likewise, since the neutral point connecting lead is made by bending the I-shaped terminating segment in the radial direction, it is possible to avoid the neutral point connecting lead from protruding inward in the axial direction beyond the inner periphery of the stator core 12.

The above explained preferred embodiments are exemplary of the invention of the present application which is described solely by the claims appended below. It should be understood that modifications of the preferred embodiments may be made as would occur to one of skill in the art.

What is claimed is:

1. A segment connection type electric rotating machine comprising:
    a stator coil comprising:
    phase coils each of which includes a U-shaped segment continuum formed by U-shaped conductor segments inserted into slots of a stator core from one of end surfaces of the stator core with respect to an axial direction of the stator core and connected to one another at the other one of the end surfaces,
    an I-shaped leading conductor segment inserted into one of the slots and connected to a lead end of the U-shaped segment continuum at the other one of the end surfaces, and
    an I-shaped terminating conductor segment inserted into one of the slots and connected to a terminal end of the U-shaped segment continuum at the other one of the end surfaces;
    a connector box fixed to an outer periphery of the stator core; and
    a power supply lead laid between the connector box and the I-shaped leading conductor segment, the power supply lead being welded at a tip portion thereof to an end portion of the I-shaped leading conductor segment in the vicinity of an axial end of the stator coil;
    wherein the U-shaped conductor segments are made of rectangular wire, and the power supply lead is made of round wire, and
    wherein the end portion of the I-shaped leading conductor segment includes a portion extending in a circumferential direction of the stator core over the axial end of the stator coil, and the tip portion of the power supply lead includes a portion extending in the circumferential direction over the axial end of the stator coil.

2. A segment connection type electric rotating machine comprising:
    a stator coil comprising:
    phase coils each of which includes a U-shaped segment continuum formed by U-shaped conductor segments inserted into slots of a stator core from one of end surfaces of the stator core with respect to an axial direction of the stator core and connected to one another at the other one of the end surfaces,
    an I-shaped leading conductor segment inserted into one of the slots and connected to a lead end of the U-shaped segment continuum at the other one of the end surfaces, and
    an I-shaped terminating conductor segment inserted into one of the slots and connected to a terminal end of the U-shaped segment continuum at the other one of the end surfaces;
    a connector box fixed to an outer periphery of the stator core; and
    a power supply lead laid between the connector box and the I-shaped leading conductor segment, the power supply lead being welded at a tip portion thereof to an end portion of the I-shaped leading conductor segment in the vicinity of an axial end of the stator coil;
    wherein the power supply lead of each phase laid between the connector box and the I-shaped leading conductor segment of each phase includes a U-bend part situated on the outer periphery of the stator core.

3. A segment connection type electric rotating machine comprising:
    a stator coil comprising:
    phase coils each of which includes a U-shaped segment continuum formed by U-shaped conductor segments inserted into slots of a stator core from one of end surfaces of the stator core with respect to an axial direction of the stator core and connected to one another at the other one of the end surfaces,
    an I-shaped leading conductor segment inserted into one of the slots and connected to a lead end of the U-shaped segment continuum at the other one of the end surfaces, and
    an I-shaped terminating conductor segment inserted into one of the slots and connected to a terminal end of the U-shaped segment continuum at the other one of the end surfaces;
    a connector box fixed to an outer periphery of the stator core; and
    a power supply lead laid between the connector box and the I-shaped leading conductor segment, the power supply lead being welded at a tip portion thereof to an end portion of the I-shaped leading conductor segment in the vicinity of an axial end of the stator coil;
    wherein the U-shaped conductor segments are made of rectangular wire, and the power supply lead is made of round wire, and
    wherein the power supply lead is laid over the outer periphery of the stator core so as to extend in the axial direction, bent inward in a radial direction of the stator core at the one of the end surfaces, and bent in a circumferential direction of the stator core to reach the I-shaped leading conductor segment.

4. The segment connection type electric rotating machine according to claim 3, wherein the end portion of the I-shaped leading conductor segment includes a portion extending in the circumferential direction over the axial end of the stator coil, and the tip portion of the power supply lead includes a portion extending in the circumferential direction over the axial end of the stator coil.

5. A segment connection type electric rotating machine comprising:
- a stator coil comprising:
  - phase coils each of which includes a U-shaped segment continuum formed by U-shaped conductor segments inserted into slots of a stator core from one of end surfaces of the stator core with respect to an axial direction of the stator core and connected to one another at the other one of the end surfaces,
  - an I-shaped leading conductor segment inserted into one of the slots and connected to a lead end of the U-shaped segment continuum at the other one of the end surfaces, and
  - an I-shaped terminating conductor segment inserted into one of the slots and connected to a terminal end of the U-shaped segment continuum at the other one of the end surfaces;
- a connector box fixed to an outer periphery of the stator core; and
- a power supply lead laid between the connector box and the I-shaped leading conductor segment, the power supply lead being welded at a tip portion thereof to an end portion of the I-shaped leading conductor segment in the vicinity of an axial end of the stator coil;

wherein the end portion of the I-shaped leading conductor segment includes a portion extending in a circumferential direction of the stator core over the axial end of the stator coil, and the tip portion of the power supply lead includes a portion extending in the circumferential direction over the axial end of the stator coil.

6. The segment connection type electric rotating machine according to claim 5, wherein the end portion of the I-shaped leading conductor segment includes a bent portion formed by bending the end portion at substantially a right angle, and the tip portion of the power supply lead includes a bent portion formed by bending the tip portion at substantially a right angle.

7. The segment connection type electric rotating machine according to claim 6, wherein the bent portions of the I-shaped leading conductor segment and the power supply lead are extended outward in the axial direction.

8. The segment connection type electric rotating machine according to claim 5, wherein each of the slots has 4n+2 (n being a positive integer) segment conductor holding spaces aligned in the radial direction, the I-shaped terminating conductor segment being held in one of the segment conductor holding spaces other than outermost one and innermost one of the segment conductor holding spaces, an end portion of the I-shaped terminating conductor segment being extended in the circumferential direction to be welded to other the end portion of other the I-shaped terminating conductor segment of other the phase coil to thereby form a neutral point.

9. The segment connection type electric rotating machine according to claim 8, wherein the I-shaped terminating conductor segment whose end portion is extended in the circumferential direction to form the neutral point is held by a second innermost one of the segment conductor holding spaces.

10. The segment connection type electric rotating machine according to claim 9, wherein the U-bend part of the power supply lead of each phase is formed by bending the power supply lead such that the power supply lead extending in the axial direction from the connector box projects in the circumferential direction and then bends in an opposite circumferential direction.

* * * * *